(12) United States Patent
Jiang

(10) Patent No.: US 7,058,076 B1
(45) Date of Patent: Jun. 6, 2006

(54) INTERNET PROTOCOL (IP)-BASED WIRELESS INFRASTRUCTURE NETWORK

(75) Inventor: Hong Jiang, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/349,521

(22) Filed: Jul. 8, 1999

(51) Int. Cl.
*H04J 1/16* (2006.01)

(52) U.S. Cl. .................................. 370/465

(58) Field of Classification Search .............. 370/465, 370/466, 467, 468, 351, 352, 401, 402, 403, 370/353, 354, 355, 356, 357, 311, 341, 395.1, 370/461; 709/226, 223, 224; 455/560, 422, 455/445
See application file for complete search history.

(56) References Cited

U.S. PATENT DOCUMENTS

| | | | |
|---|---|---|---|
| 6,256,314 B1 * | 7/2001 | Rodrig et al. ............. | 370/401 |
| 6,282,184 B1 * | 8/2001 | Lehman et al. ............ | 370/342 |
| 6,314,284 B1 * | 11/2001 | Patel et al. ............... | 455/417 |
| 6,483,470 B1 * | 11/2002 | Hohnstein et al. ......... | 343/721 |
| 6,496,477 B1 * | 12/2002 | Perkins et al. ............ | 370/228 |
| 6,522,641 B1 * | 2/2003 | Siu et al. .................. | 370/338 |
| 6,523,064 B1 * | 2/2003 | Akatsu et al. ............. | 709/226 |
| 6,526,034 B1 * | 2/2003 | Gorsuch ................... | 370/338 |
| 6,529,499 B1 * | 3/2003 | Doshi et al. .............. | 370/352 |
| 6,570,855 B1 * | 5/2003 | Kung et al. ............... | 370/237 |
| 6,853,851 B1 * | 2/2005 | Rautiola et al. .......... | 455/553.1 |

OTHER PUBLICATIONS

"Narrowband and Broadband Infrastructure Design for Wireless Networks" by S. Dravida, Hong Jiang, M. Kodialam, B. Samadi, and Y. Wang, IEEE Communications Magazine, vol., 36, No. 5, May 1998.

"Mobility Management for a Multimedia Mobile Network" by W. Ahmed, B. Doshi, S. Dravida, Hong Jiang, K. Rege, C. Graff, annd M. Bereschinksy, Networld+Interop '99, Las Vegas, May 10-14, 1999.

"GeRM: Generic RTP Multiplexing", by M. Handley, work in progress, draft-ietf-avt-germ-00.txt.

"IP Micro-Mobility Support through HAWAII" by R. Ramjee, T. LaPorta, S. Thuel, and K. Varadhan, work in progress, draft-ramjee-micro-mobility-hawaii-00.txt, Mar. 1999.

Press Release—Motorola's Website—Chandler, Arizona, Jun. 7, 1999, "Motorola and Cisco Jointly Purschase Bosch Telecom Unit; Create New Company Called SpectraPoint Wireless to Deliver Broadband Services".

Company Press Release—San Jose, California, May 25, 1999, "Cisco Systems Introduces New Packet Telephony Solutions and Scaling Breakthroughs to Enable New Revenue Generating Services for Service Providers" May 25, 1999, San Jose, California.

Press Release—Motorola's Web Site—New Orleans, Louisiana, Feb. 8, 1999, "Cisco and Motorola to Form Strategic Alliance to Build Internet-Based Wireless Networks".

* cited by examiner

*Primary Examiner*—Dang Ton

(57) ABSTRACT

A "Wireless INfrastructure Network"(WINN) comprises packet endpoints such as servers, routers, base stations and gateways. No mobile switching center (MSC) is required. Communications between these endpoints is Internet Protocol (IP) based and voice communications between base station endpoints occurs directly without use of an MSC. Each base station comprises a router and converts wireless air interface signaling to a common IP signaling format.

12 Claims, 7 Drawing Sheets

Base Station

200

Prior Art

INTERNET PROTOCOL (IP)-BASED WIRELESS INFRASTRUCTURE NETWORK

CROSS-REFERENCE TO RELATED APPLICATIONS

Related subject matter is disclosed in the co-pending, commonly assigned, U.S. patent application of: Chuah et al, entitled "A Lightweight Internet Protocol Encapsulation (LIPE) Scheme For Multimedia Traffic Transport," application Ser. No. 09/264,053, filed on Mar. 8, 1999.

BACKGROUND OF THE INVENTION (1) Field of the Invention

This invention relates generally to communications and, more particularly, to wireless communications systems.

(2) Background Art

As used herein, the phrase "Wireless INfrastructure Network" or WINN refers to the wire-line portion of a wireless network that interconnects base transceiver stations (BTSs), mobile switching centers (MSCs), and base station controllers (BSCs), if any. The architectures of current WINNs have evolved from the AMPS (Advanced Mobile Phone Service) architecture which was formed two decades ago. The architecture considerations for these networks were driven by the need to interwork with the public switched telephone network (PSTN) and the requirements of voice services. For example, there is a hierarchical structure in which all traffic is routed first through an MSC to the PSTN.

It should be noted that although somewhat similar in hierarchical structure, each WINN is significantly different from the others. For example, each WINN supports a different wireless air interface technology, which couples the mobile units to the BTS. Examples of some wireless air interface technologies are: AMPS, CDMA (code division multiple access), GSM (Global System for Mobile Communications), and the proposed UMTS (Universal Mobile Telecommunications System). In addition, each WINN also has unique signaling protocols, e.g., between a base station and an MSC. Consequently, each WINN needs to be developed and maintained separately.

However, WINNs continue to evolve. Communication between an MSC and a BTS is evolving to a packet-based approach. For example, frame relay pipes can be used to transport voice and data traffic between an MSC and a BTS. Also, ATM (Asynchronous Transfer Mode) is being evaluated for use in transport of wireless traffic. Finally, there is Internet Protocol (IP) based transport (e.g., see the co-pending, commonly assigned, U.S. patent application of: Chuah et al, entitled "A Lightweight Internet Protocol Encapsulation (LIPE) Scheme For Multimedia Traffic Transport," application Ser. No. 09/264,053, filed on Mar. 8, 1999.) However, within this evolution towards a packet-based approach, evidence of the AMPS architecture can still be found (e.g., a hierarchical structure in which all traffic is routed first through an MSC).

SUMMARY OF THE INVENTION

A new WINN architecture is totally Internet Protocol (IP) based. This WINN architecture comprises a plurality of packet endpoints communicating via IP-based signaling such that an intra-WINN call is established between two mobile endpoints without the use of a mobile switching center. In accordance with the inventive concept, a base station comprises a router and converts wireless air interface signaling into a common IP signaling format.

In an embodiment, a "Wireless INfrastructure Network" (WINN) comprises packet endpoints such as servers, routers, base stations and gateways. No mobile switching center (MSC) is required. Communications between these endpoints is Internet Protocol (IP) based and voice communications between base station endpoints occurs directly without use of an MSC. Each base station comprises a router and converts wireless air interface signaling to a common IP signaling format.

DETAILED DESCRIPTION

Figure 1:
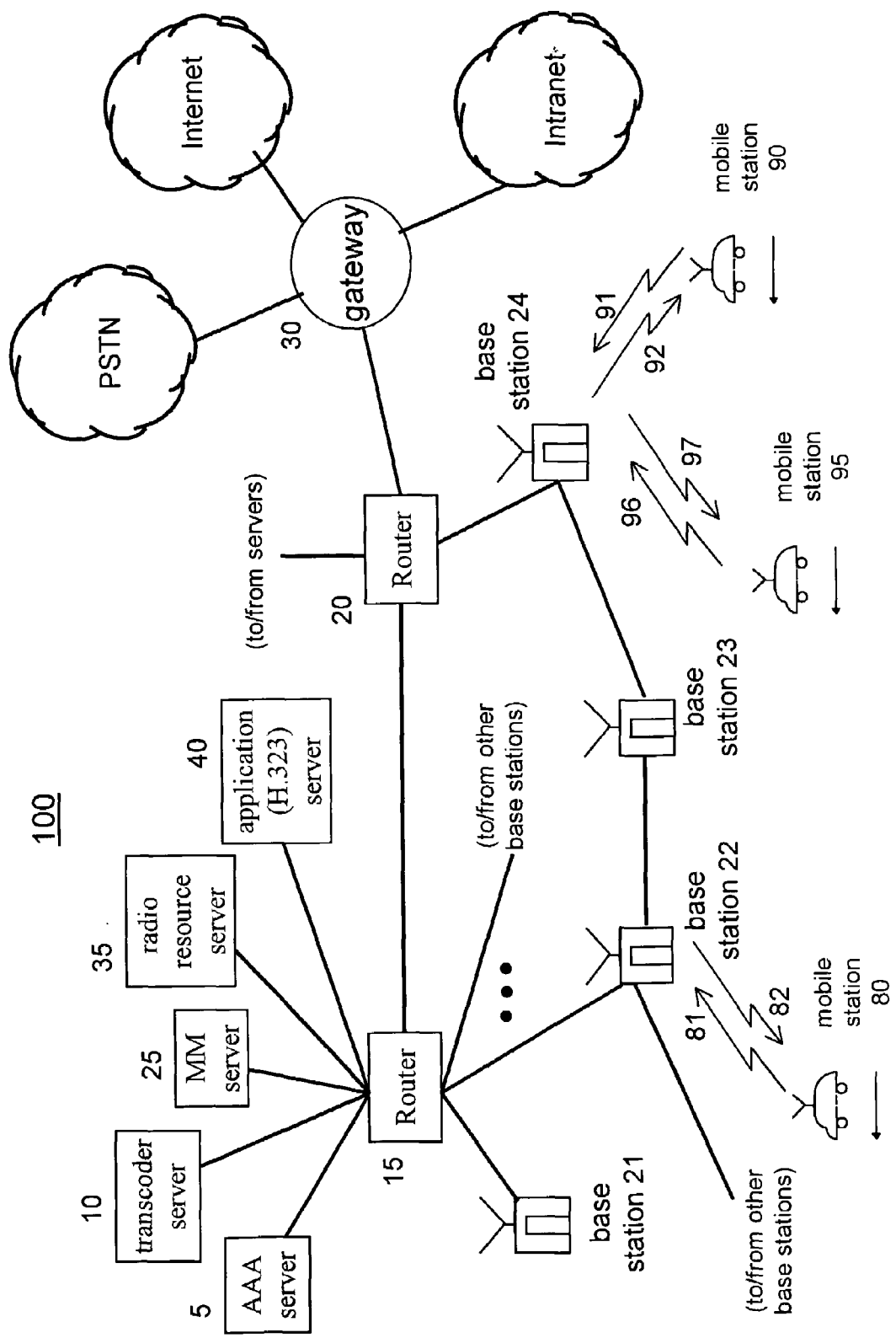
FIG. 1 shows an illustrative WINN architecture in accordance with the principles of the invention.

An illustrative new WINN architecture is shown in FIG. 1. Other than the inventive concept, the elements shown in FIG. 1 are well known and will not be described in detail. Further, it is presumed that the elements described below are suitably programmed to carry out the below-described methods using conventional programming techniques, which, as such, will not be described herein.

WINN 100 comprises a number of packet endpoints, e.g., a plurality of base stations (e.g., 21, 22, 23, and 24), routers (e.g., 15 and 20), and servers (e.g., 5, 10, 25, 35 and 40), all of which are coupled via packet facilities represented by solid lines. In particular, communications between routers, servers and base stations is Internet Protocol (IP) based. WINN 100 is coupled to gateway 30 for communications to and from other networks such as the PSTN, Internet, and/or an Intranet. Gateway 30 (described below) is responsible for the interworking between WINNs and these other networks.

It should be realized that the structure of WINN 100 is representative of the inventive concept. For example, base stations 21, 22, 23 and 24 are representative of any number of base stations which provide communications between a packet network and an air interface (as represented by uplink signal 91 and downlink signal 92 from/to mobile station 90). Similarly, each base station has an associated wireless air interface for communicating to, and from, wireless endpoints as represented by mobile stations 80, 90 and 95. In like fashion, routers 20 and 15, along with servers 5, 10, 25, 35 and 40, illustrate that any number of routers and servers can be configured within a WINN architecture in accordance with the inventive concept.

Before describing an illustrative method for establishing a wireless telephone call using the architecture of WINN 100, a number of points should be noted about this architecture.

First, it should be noted that WINN 100 bypasses the use of MSCs (although an MSC (not shown) could be coupled to the network of WINN 100 via a packet interface). As such, and as can be observed from FIG. 1, there is no need to route traffic between base stations via an MSC. In other words, WINN 100 provides direct connectivity between base stations—without an MSC. Consequently, the architecture of WINN 100 is not strictly hierarchical as a conventional WINN network (in which base stations first communicate with MSCs). As described further below, and in accordance with the inventive concept, direct communications at the base station level, or within the base station is allowed. For instance, if a mobile user A (associated with mobile station 95) and a mobile user B (associated with mobile station 90) are both within the coverage area of the same base station (as represented by base station 24) and need to communicate then, and in accordance with the invention, the bearer traffic between mobile user A and a mobile user B occurs within that same base station (here, base station 24). Thus the required network resources including bandwidth and processing power for the call are reduced. Similarly, if mobile user A and a mobile user C (associated with mobile station 80) are within the coverage areas of different base stations (as represented by base station 22 and base station 24), the bearer traffic between mobile user A and mobile user C is routed on the shortest path of WINN 100 just between the base stations (e.g., via base station 23). Most importantly, by not having to go through any MSC for intra-WINN traffic, access charges by the local telephone companies can be avoided.

Second, WINN 100 unifies the interface to heterogeneous wireless air interfaces (described further below). In other words, under the architecture represented by WINN 100, there is one common WINN. Only the wireless air interfaces will differ, ranging from CDMA, GSM to 802.11. The coupling of different wireless air interfaces to the wired network of WINN 100 is performed by respective base stations. (It should be noted that although WINN 100 has the capability of supporting different wireless air interfaces, the inventive concept does not require the use of different wireless air interfaces, e.g., only CDMA could be used.)

Third, and as can be observed from FIG. 1, in WINN 100 routing (or switching) is separated from various layers of signaling. Routing is performed by routers, e.g., router 15 of FIG. 1. These routers function as in the prior art, i.e., routing IP traffic, and can be viewed as traffic concentrators for outbound traffic. Processing of signaling messages is performed by servers. A set of servers are directly attached to each router (e.g., servers 5, 10, 25, 35 and 40 are coupled to router 15). (It should be noted that it is not necessary in the inventive concept for each router to have a set of servers, or any server for that matter.) Each server provides additional processing capacity for signaling messages and bearer traffic. For example, server 5 is an Authentication, Authorization and Accounting Server (AAA server) as known in the art. Server 10 is a transcoder server, which converts voice from one vocoder format to another vocoder format. For example, if different vocoders were required in the above described example of mobile user A communicating with mobile user C, then the bearer traffic between mobile user A and mobile user C is routed to transcoder server 10, where vocoder formats are converted.

Server 25 is a mobility management (MM) server, which is used to manage micro mobility of mobile endpoints (e.g., which base station currently serves a particular mobile endpoint). Server 35 is a radio resource server, which manages the resource allocation of air interfaces to the base stations. And, server 40 is an application server, which supports ITU-T H.323 (alternatively, the Session Initiation Protocol (SIP) can be used), and the Real-Time Streaming Protocol (RTSP) from IETF, for providing signaling for call/connection management for multimedia applications and for interworking with existing networks such as the PSTN. This decoupling of routing from signaling allows WINN 100 to scale well and to introducing new capabilities and applications easily.

As noted above, WINN 100 uses IP-based communications. Illustratively, IP is terminated at the respective base stations of WINN 100, and the existing wireless air interface bearer transport is used between the base stations and the mobile endpoints. (Alternatively, IP can be terminated at the mobile user endpoint. In this case, end-to-end voice-over-IP is implemented and header compression should be used to reduce the packet overhead when using protocols such as RTP (real time protocol), UDP (user datagram protocol) and IP over the narrow air links.) Since WINN 100 uses IP-based communications, gateway 30 is responsible for interworking between WINN 100 and other networks as represented by the PSTN, Internet and Intranet of FIG. 1. For interworking with the PSTN, gateway 30 converts between H.323 signaling and SS7 signaling and is, essentially, an MSC (in this context, gateway 30 also includes vocoders (not shown) for converting to PSTN-based 64 Kbits/sec. PCM). With respect to IP-based transport, gateway 30 functions as a router.

Figure 2:
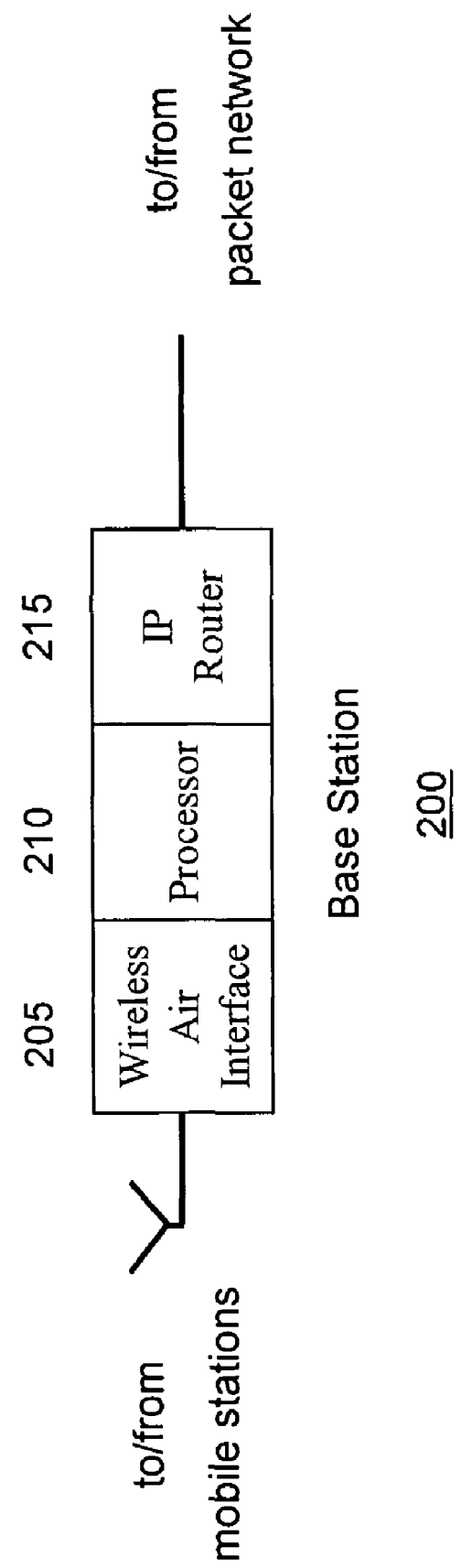
FIGS. 2 and 3 show block diagrams of an illustrative base station in accordance with the principles of the invention.
Figure 3:
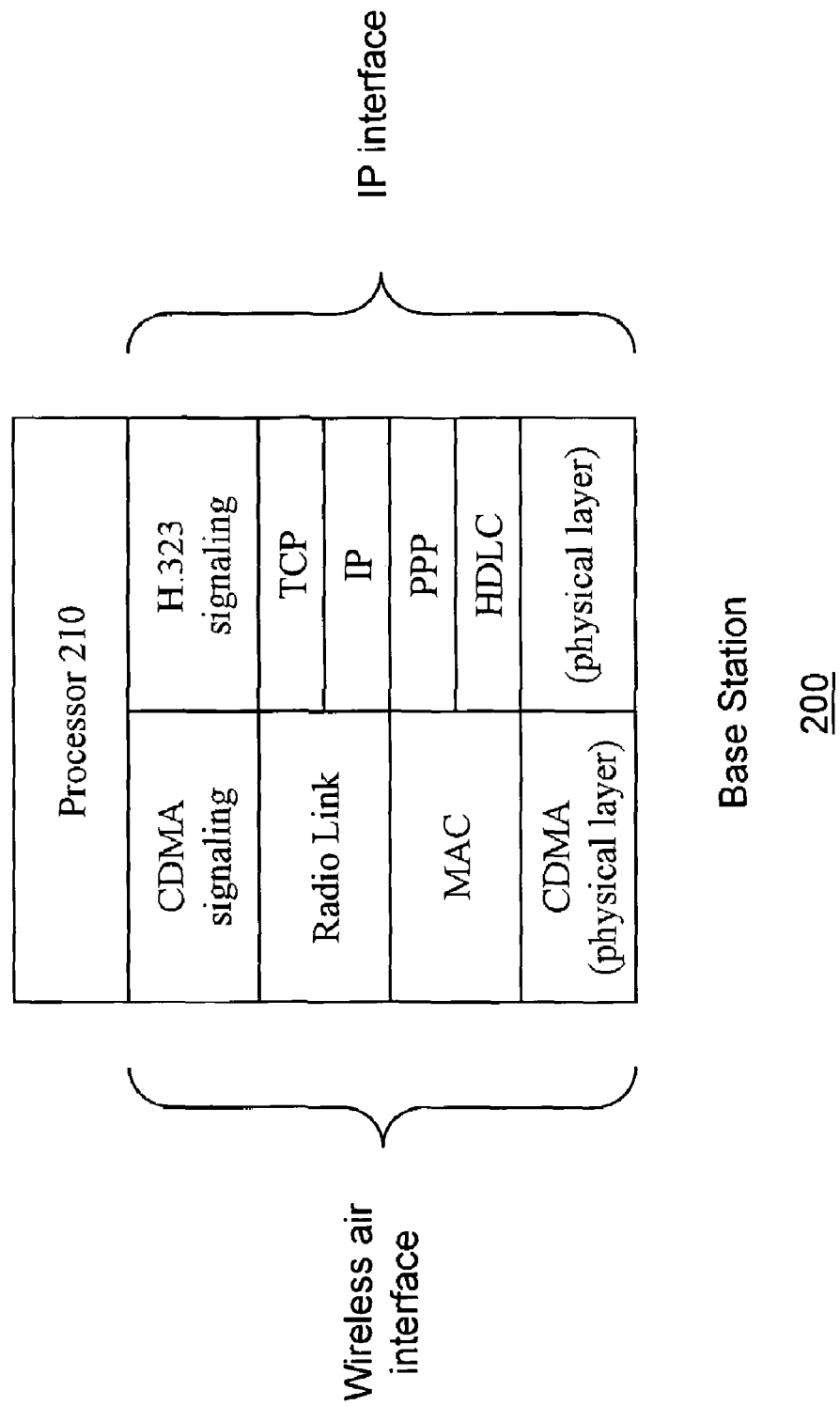

An illustrative base station 200 for use in WINN 100 is shown in FIG. 2. Base station 200 comprises wireless air interface 205, processor 210 and, in accordance with the inventive concept IP router 215. Other than the inventive concept, the elements shown in FIG. 2 are well known and will not be described in detail. For example, processor 210 includes stored-program-control processors and memory, and wireless air interface 205 includes appropriate interface cards for interfacing to any of the existing wireless air interfaces, e.g., CDMA industry standard IS-95, for sending communications to, and receiving communications from, a wireless endpoint (e.g., mobile station 90 of FIG. 1). (Although shown as one wireless air interface, a base station may interface to more than one particular air interface. For example, a base station may include interfaces for both AMPS and CDMA at the same time, albeit at a reduced capacity.) As such, it should be noted that the inventive concept does not require changes to existing wireless air interfaces—they are kept intact. In particular, and in accordance with the inventive concept, processor 210 converts all wireless air interface-signaling messages to common IP-based signaling messages. Thus, the use of a particular wireless air interface such as TDMA, CDMA and GSM by a base station is transparent to WINN 100. This is illustrated in FIG. 3, where processor 210 converts between CDMA signaling (received via wireless air interface 205) and H.323 signaling communicated via IP router 215. As can be observed, FIG. 3 shows illustrative protocol stacks for use in base station 200 with respect to the signaling for the wireless air interface and the IP interface (the bearer traffic is not shown). Other than the inventive concept, these elements are well-known and will not be described herein. For example, PPP is the point-to-point protocol, MAC is the medium access control layer, TCP is the transaction control protocol, etc.

In addition, and in accordance with the inventive concept, base station 200 comprises IP router 215 which interfaces base station 200 to the network of WINN 100 for the purpose of communicating with other base stations (e.g., base station 22 of FIG. 1) or other network nodes (such as routers 15 and 20 of FIG. 1). In this example, it is assumed that base station 200 comports with the standard Open Shortest Path First (OSPF) protocol as known in the art. In particular, includes OSPF functionality in base station 200 enables base station 200 to form a routing table (not shown) by passing link and node state control information with other packet endpoints.

(Alternatively, other routing protocols may be used such as the Interior Gateway Routing Protocol (IGRP) from Cisco Systems, Inc.)

As such, communications arriving at the base stations from wireless endpoints are formed into packets and routed by the base station. The packets can be routed to an adjacent base station, to a traffic concentrating router, or to any other node in WINN 100, depending on the destination of the packets.

Figure 4:
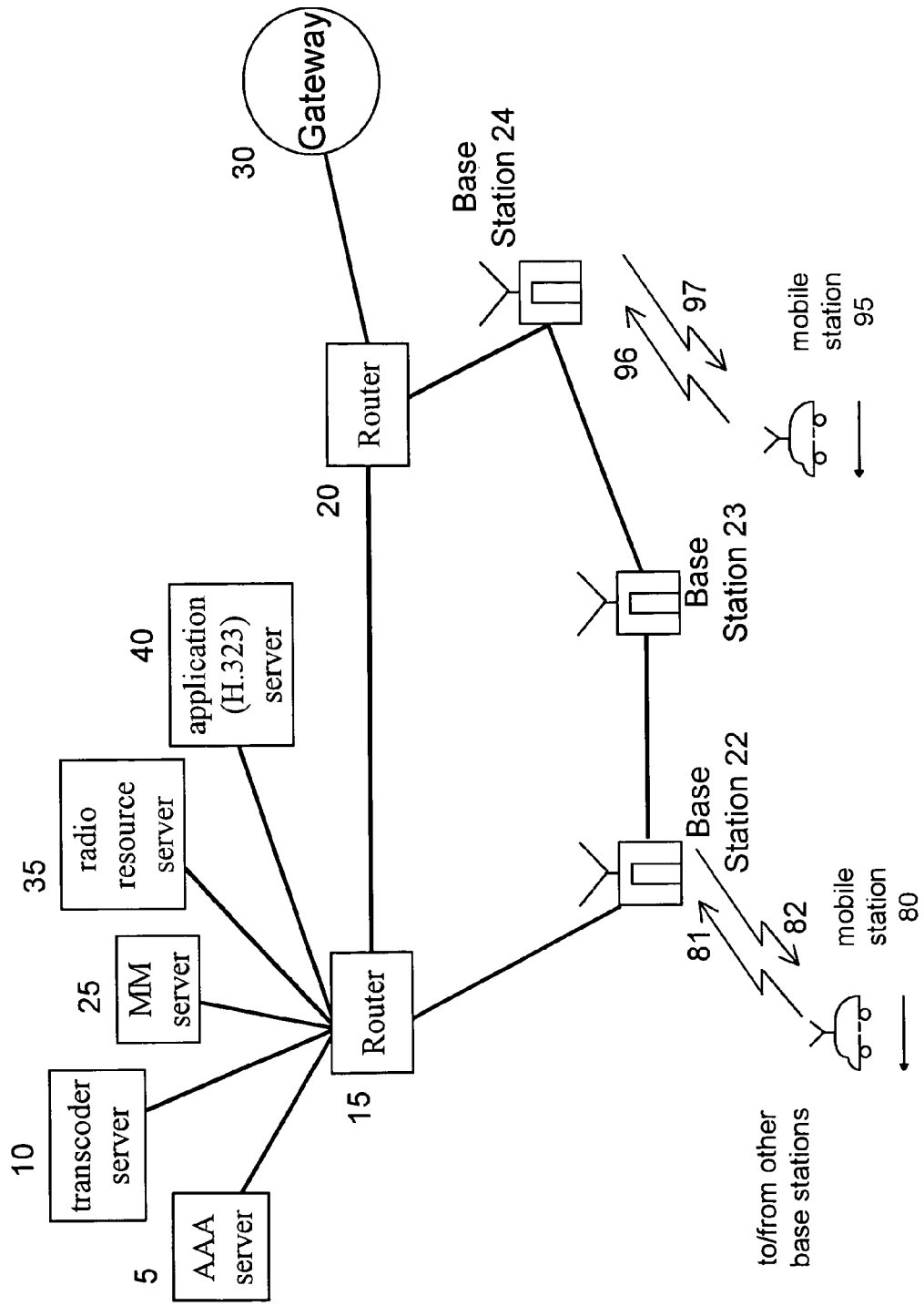
FIG. 4 shows a portion of WINN 100 of FIG. 1.
Figure 5:
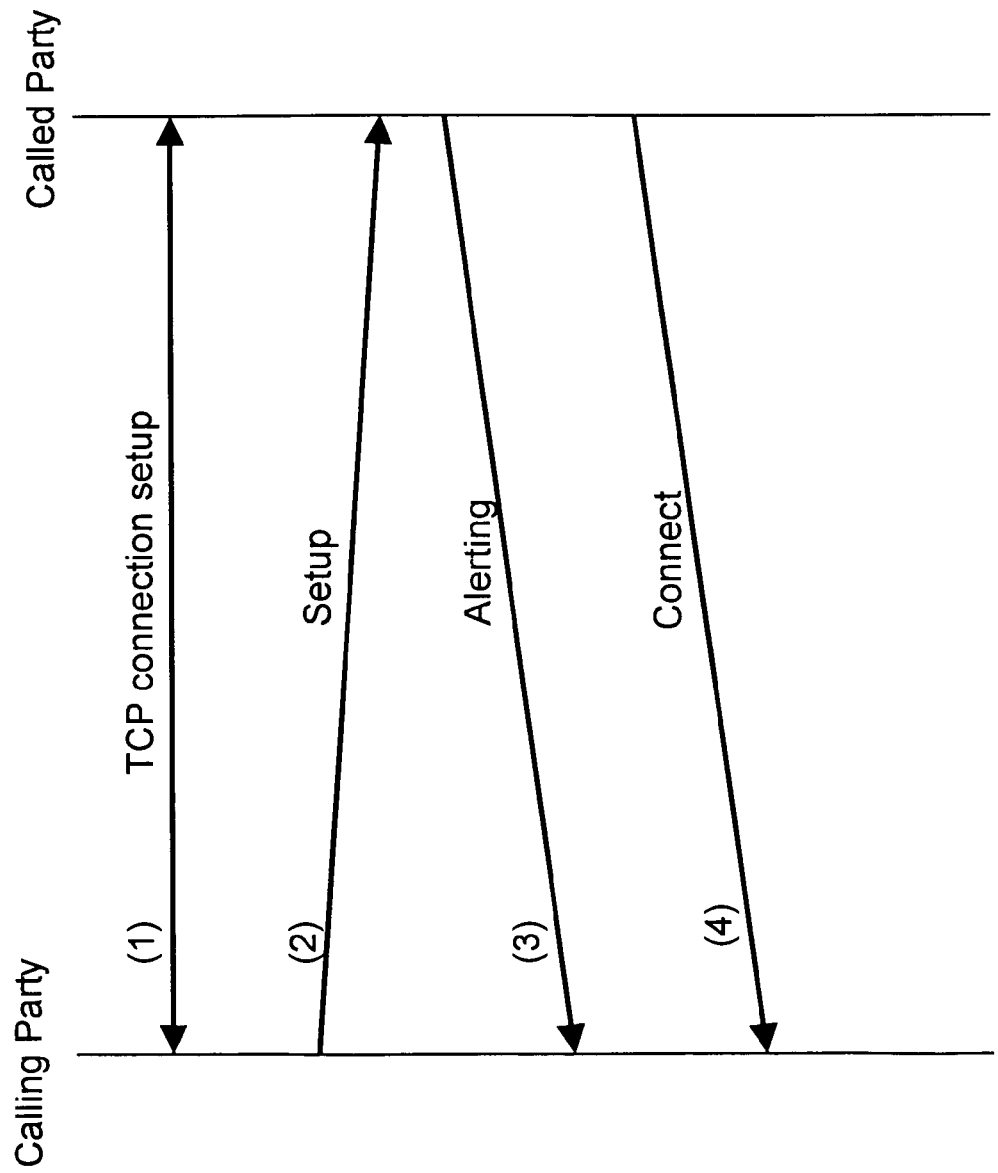
FIG. 5 shows an illustrative message exchange between packet endpoints of FIG. 4 for establishing a call between mobile endpoints.

Turning now to FIGS. 4 and 5, these figures show an illustrative call setup procedure in accordance with the principles of the invention. (As noted above, the following description assumes that the IP interface is terminated at the respective base station. As such, in the context of this example, each base station handles that part of the IP signaling required by the calling party and the called party. However, if the IP interface is terminated at the mobile endpoint then the below-described call setup is performed by the mobile stations, e.g., as described below, mobile station 80 forms a query to MM server 25 for the IP address of the called party, etc.).

FIG. 4 shows a simplified version of the drawing of FIG. 1 for the purposes of illustration. A mobile user C (not shown), associated with mobile station 80, desires to set up a wireless call with a mobile user B (not shown), associated with mobile station 95. As in the prior art, mobile user C simply dials the telephone number a priori associated with mobile user B. (For the purposes of this example, it is assumed that CDMA is the wireless air interface between the mobile station and the base station.) Base station 22 comprises a CDMA interface (which corresponds to wireless air interface 205 of FIG. 2) and, as in the prior art, exchanges signaling messages with mobile station 80. Upon receipt of the called number, base station 22 queries MM server 25 for an associated IP address of mobile station 95. (The base stations learn of the IP addresses of these servers through different mechanisms, as known in the art, e.g., each server can periodically broadcast its IP address to the network.) As noted above, MM server 25 tracks mobile stations and maintains an association between a telephone number and a currently assigned IP address for each mobile station (e.g., see R. Ramjee, T. La Porta, S. Thuel, K. Varadhan, "IP Micro-Mobility support through HAWAII," work in progress, draft-ramjee-micro-mobility-hawaii-00.txt, March 1999). (It should be noted that if MM Server 25 does not have the associated IP address of the mobile station, MM Server 25 forwards the query as known in the art to another server (not shown) in order to retrieve the IP address.) At this point reference should also be made to FIG. 5, which further illustrates a simple H.323-based call setup method for use between a calling party (represented by mobile station 80) and a called party (represented by mobile station 95). As such, and in accordance with the invention, base station 22 incorporates an H.323 agent (e.g., see FIG. 3). After MM server 25 returns the IP address of mobile station 95, base station 22 establishes a TCP connection (1) with the called party (again, as noted above, in this example base station 24 handles the IP interface for mobile station 95 (the called party)). In particular, the calling party initiates the call by first making a TCP connection (1) using the well known port for H.323 (port 1720); this connection is used to carry all H.225.0 call signaling messages. After the TCP connection is established, the calling party sends an H.323 setup message (2) to the called party. In reply, the called party sends an H.323 alerting message (3) to the calling party, indicating that the user is being notified of the incoming call. If the user answers the call (at mobile station 95), the called party sends the H.323 connect message (4) to the calling party. As part of this exchange, called and calling parties also send a dynamic port number to be used for the H.245 connection. The two parties then establish the H.245 control channel, begin capability exchange, and open media stream channels for audio, video and/or data. After setting up the H.245 connection, virtually all the protocol activities take place on the H.245 connection. Either party may terminate an H.323 call by sending an H.245 'endsessioncommand' message. An H.323 call is also terminated when the H.245 control/connection is lost. Once the call is established, mobile user C and mobile user B can start talking directly without having to go through an MSC. For example, base station 22 communicates bearer traffic (e.g., voice) associated with the mobile call by transmitting IP packets to base station 24 using the above-mention OSPF routing information. In the context of FIG. 4, bearer traffic is communicated between base station 22 and base station 24 via base station 23.

(It should be noted that FIG. 5 represents a simplified call setup procedure. However, in order to perform authorization, admission control and billing, call setup may be performed through the servers, e.g., application server 40, AAA server 5, etc. This would be the case even if the mobile endpoints are within the coverage area of the same base station in order to ensure collection of billing and traffic statistics.)

Figure 6:
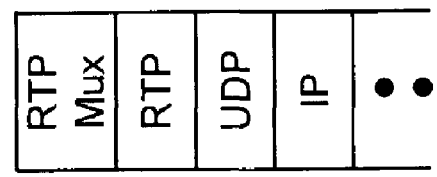
FIGS. 6 and 7 show illustrative portions of protocol stacks for use in transporting voice over IP.

For the transport of voice over IP, any one of a number of known protocols can be used. For example, the Real Time Protocol (RTP) (e.g., see H. Schulzrinne, R. Frederick, V. Jacobson, "*RTP: A Transport Protocol for Real-Time Applications*," RFC 1889), which handles real-time streams. RTP traffic is encapsulated in UDP (user datagram protocol), and IP packets and its efficiency can be improved by use of a multiplexing scheme (e.g., see M. Handley, "GeRM: Generic RTP Multiplexing," work in progress, draft-ietf-avt-germ-00.txt, May 1999). An illustrative portion of a protocol stack, 60, using an RTP-based multiplexing scheme is shown in FIG. 6 for use in a packet endpoint (e.g., a base station) of WIN 100 of FIG. 1. Traffic is first multiplexed via the RTP Mux layer. RTP traffic is then encapsulated in UDP and IP packets. (It should be noted that other layers (not shown) also exist above and below. For example, below the IP layer sits the media access control (MAC) layer, which is on top of the physical layer, as known in the art.)

Figure 7:
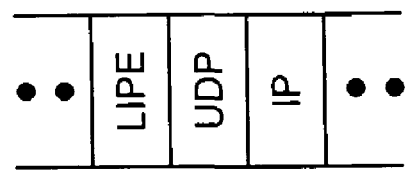

However, the above-described approach does not address QoS. For QoS support, the Multi Protocol Label Switching (MPLS), differentiated services and ReSource ReserVation Protocol (RSVP) are available. Alternatively, the co-pending, commonly assigned, U.S. patent application of: Chuah et al, entitled "A Lightweight Internet Protocol Encapsulation (LIPE) Scheme For Multimedia Traffic Transport," application Ser. No. 09/264,053, filed on Mar. 8, 1999, describes an alternative packet encapsulation scheme for multiplexing application sessions—Lightweight IP Encapsulation (LIPE), which supports QoS. An illustrative portion of a protocol stack, 70, using LIPE is shown in FIG. 7.

As a result of the above, WINN 100 allows a wireless service provider to provide low-cost wireless services. This new architecture is also well suited for markets where there is significant intra-WINN traffic since direct communications is allowed at the base station level, and thus there is no need for every call to go through a central node such as an MSC as in current WINN architectures.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., IP router 215, etc., the functions of any one or more of those building blocks can be carried out using one or more appropriately programmed processors, e.g., a digital signal processor; discrete circuit elements; integrated circuits; etc.

The invention claimed is:

1. A base station for use in a wireless network, the base station comprising:
   a wireless air interface element for communicating with a wireless endpoint;
   an Internet Protocol (LP) router for routing packets over an IP-based network; and
   a processor for converting signaling messages received from the wireless air interface element to a common signaling format for transmission via the IP router,
   wherein the wireless air interface element employs at least two different types of wireless air interfaces selected from the group consisting of Advanced Mobile Phone Service (AMPS), Code Division Multiple Access (CDMA), Time Division Multiple Access (TDMA), Global System for Mobile Communications (GSM), 802.11 and Universal Mobile Telecommunications System (UMTS).

2. The base station of claim 1 wherein the IP router queries the IP-based network for forming a routing table for use in routing packets from other packet endpoints of the IP-based network.

3. The base station of claim 2 wherein the IP router routes packets from one base station to another base station.

4. The base station of claim 2 wherein the IP router uses an Open Shortest Path First (OSPF) based protocol for forming the routing table.

5. The base station of claim 2 wherein the IP router uses an Interior Gateway Routing Protocol (IGRP) based protocol for forming the routing table.

6. A wireless infrastructure network comprising:
   at least one base station for communicating information between a wireless endpoint and an Internet Protocol (IP) based packet network, said at least one base station employs at least two different types of wireless air interfaces selected from the group consisting of Advanced Mobile Phone Service (AMPS), Code Division Multiple Access (CDMA), Time Division Multiple Access (TDMA). Global System for Mobile Communications (GSM), 802.11 and Universal Mobile Telecommunications System (UMTS);
   at least one server, which is accessed by the base station for establishing a telephone call between the wireless endpoint and another endpoint; and
   at least one router, coupled to the IP based packet network, for routing communications transmitted from the base station to the server;
   wherein the wireless infrastructure network does not include a mobile switching center (MSC).

7. The wireless infrastructure network of claim 6 wherein the base station comprises a router portion for routing packets through the base station to other portions of the IP based packet network.

8. The wireless infrastructure network of claim 6 further comprising a gateway server for coupling to a switched network.

9. The wireless infrastructure network of claim 6 further comprising a gateway server for coupling to another IP-based network.

10. The wireless infrastructure network of claim 9 wherein the gateway provides Internet access.

11. The wireless infrastructure network of claim 9 wherein the gateway provides access to an intranet.

12. The base station of claim 1, wherein the common signaling format is ITU H.323.

* * * * *